United States Patent
Enzo

(10) Patent No.: US 7,265,776 B2
(45) Date of Patent: Sep. 4, 2007

(54) SYSTEM FOR COMMERCIAL USE TO STORE AND COPY IMAGES DOWNLOADED FROM A MEMORY UNIT FOR DIGITAL EQUIPMENT AND ITS RELATIVE APPARATUS

(75) Inventor: Melchiori Enzo, Conegliano (IT)

(73) Assignee: Polidea SrL, Conegliano (IT)

( * ) Notice: Subject to any disclaimer, the term of this patent is extended or adjusted under 35 U.S.C. 154(b) by 1116 days.

(21) Appl. No.: 10/282,710

(22) Filed: Oct. 29, 2002

(65) Prior Publication Data

US 2003/0091340 A1 May 15, 2003

(30) Foreign Application Priority Data

Nov. 9, 2001 (IT) .......................... TV2001A0149

(51) Int. Cl.
*H04N 7/18* (2006.01)
(52) U.S. Cl. .......................................... 348/96; 348/97
(58) Field of Classification Search ........... 348/80–300
See application file for complete search history.

(56) References Cited

U.S. PATENT DOCUMENTS

| 6,396,963 B2* | 5/2002 | Shaffer et al. ............... 382/305 |
| 2003/0144917 A1* | 7/2003 | Sailus et al. .................. 705/26 |
| 2003/0154133 A1* | 8/2003 | Furon et al. .................. 705/16 |

* cited by examiner

*Primary Examiner*—Andy Rao
(74) *Attorney, Agent, or Firm*—Egbert Law Offices

(57) ABSTRACT

A system to store and copy images downloaded from the memory unit for digital equipment and its relative apparatus. There is the transfer of the contents from the memory of the digital equipment to a data-storage, process and reproduction unit for the images and soundtrack, which is located inside a service center. The transfer is carried out by extracting the memory support unit in order to insert it in the image soundtrack storage, processing and copying unit, which downloads the content into the memory of the unit so that the memory support unit may be returned to the customer, that is, the contents of the memory transferred via air-waves to the main memory of the data-storage unit. The images and/or soundtrack are processed and copied on to a support in Video CD or Super Video CD form and/or on to a DVD in DVD format, and the images are sent to a receiver station.

7 Claims, 3 Drawing Sheets

SYSTEM FOR COMMERCIAL USE TO STORE AND COPY IMAGES DOWNLOADED FROM A MEMORY UNIT FOR DIGITAL EQUIPMENT AND ITS RELATIVE APPARATUS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The object of this invention is a system, for commercial use, to store and reproduce images downloaded from a memory unit for digital equipment, and its relative apparatus.

The invention is used particularly, but not exclusively, in the sector involved in products and services for photography and information technology, and for the activities of marketing and relative services aimed at satisfying individual needs connected to the consumer's use of images and sounds.

BACKGROUND OF THE INVENTION

For a number of years, along with conventional cameras, there are also innovative digital cameras and video-cameras available on the market. This new kind of equipment means that images may be obtained and recorded in memory units, such as flash cards, smart cards and memory sticks.

It is well known that these kinds of memory support units currently cost more than traditional films which use negatives, and generally have a limited image storage capacity with, therefore, a very limited memory capacity. For information purposes, the average capacity of this kind of memory support unit used with digital cameras and/or video-cameras varies from 8 Mb to 64 Mb. With this amount of memory available, around 20 to 80 medium-resolution images may be recorded. It is quite clear, therefore, that in order to use the memory support unit each time it is close to or reaches its full capacity, the contents of the units have to be transferred onto other memory units to "save" the images photographed or filmed, and in order to use the memory support units again.

On the other hand, while it is true to say that the cost of the support units is falling slightly, it is still necessary to buy support units with an even larger capacity, because the resolution of digital cameras is increasing, which means that the images take up more space. This means that, in order to store the same number of images, the cost of the support units is increasing.

Finally, it is fairly clear that, whoever uses this kind of digital equipment, wishes to store the images taken in a safe, practical manner. At the same time, the expensive memory support unit has to be emptied in order to carry on taking photographs. These two requirements may be satisfied by copying the images contained in the memory of a camera, for example, to a more easily usable and cheaper memory unit, such as a CD.

Most people who own and use digital cameras and video-cameras carry out the operation of storage to the hard disk of their computer at home or in the office by themselves, which leads to a considerable amount of time being involved and a sometimes difficult storage and subsequent recovery system of the files which contain the images.

After a certain length of time, even the fixed memory of the computers (hard disk) may be filled up, which leads to all the applications of the computer being slowed down. It is also well known that files may be copied from the computer on to a CD, but only a fraction of computers currently installed have a CD burner and, what is more, the operations involved in creating a CD are quite complex for non-expert users.

Another alternative for owners of digital cameras, especially for those who do not own their own PC, is to go to a photography shop to copy and transfer the images on to a CD. The transfer of the images is not usually carried out on the premises, but rather in a specialized laboratory. The time required to prepare the CD and to hand back the memory support unit is usually from one to several days.

In those cases where the photography shop has its own latest generation mini-lab (digital), the transfer of the images on to a CD may be carried out using this equipment. However, a mini-lab is very expensive and is dedicated to the making of prints, so it is doubly disadvantageous when used for making a CD. The disadvantage for the owner of the photography shop is that the printing productivity is limited and a specialized technician is required, while for the customer there is the disadvantage of having to wait for this service and having to lose sight of his own costly support unit for an hour or even more.

Recently, kiosks have begun springing up where a number of services are offered on site with delivery in less than an hour, such as the transfer of images from the memory units of cameras on to a CD. The kiosk is usually is made up of a mobile unit with a personal computer inside with a "touch screen" which is potentially easy to use. The kiosks currently on the market offer a number of services, such as the copying of photographs, printing post-cards, etc. The variety of services available and the low level of innovation of the software used means that the kiosk is not always easy to use, such as in the case of a client who wishes to make a CD where a large number of operations have to be carried out, some of which are not always easy to follow.

One type of kiosk service which would seem to have solved the problem is described in US2001/0017652 (Sato), or in some of the proposals offered by Kodak. This system uses predisposed digital cameras, which transmit the data of the images to a base station where it is received. The data is then transferred to a processing and printing unit in a multi-function center. The limit of this solution is given by the fact that the cameras may only be used within the boundaries defined by the image-reception capacity of the receiver station, a limit which could be applied to well-defined recreation areas, such as theme parks.

Once the photographs have been taken, one of the basic requirements of who uses this kind of system is to be able to see them and/or show them to other people, such as friends and relatives.

The following choices are available:

1) printing of the photograph, usually through a photography shop, where the photograph is printed on the premises if the owner has a mini-lab or through an industrial-scale laboratory, or by using a normal inkjet printer which is usually to be found at home or in the office;

2) looking at the photograph on the monitor of a computer;
3) looking at the photograph on a normal television screen, by directly connecting it to the digital camera;
4) sending the image via e-mail; and
5) storage of the image on an internet site where authorized users may go and see the images.

In order to print digital images, to transmit them via internet and to view them on a computer screen, there are a variety of systems available on the market, such as the one described in JP2000324473 (Fukatsu). This consists of equipment with a display and a memory unit to transmit digital images via radio or telephone, which are then read and checked by a separate, remote instrument. The system which is offered seems relatively simple to use, but there are costly obligations involved, such as having to take out membership with the provider of the service. In order to view photographs on normal television screens, on the other hand, there are only a few systems available, such as the so called Photo-CD players which are expensive and quite difficult to use.

One way of viewing images on a television screen is to connect it to a personal computer. This system requires a computer which is positioned close to the television, and which has a special video card. If a user wishes to add a simple function, such as a remote control, the user must use a remote control for computers, which is expensive and also difficult to find.

Another way is to connect the digital camera directly to the television, but the images which are shown are only those memorized on the dedicated support systems, not those stored on CD.

Recently, some large laboratories have started offering or announcing the availability of a service for downloading images on DVD. DVD may then be used by the ever more common DVD players in order to view the images on the television screen. The downloading of the images, which is carried out by specialized technicians in a centralized laboratory, is expensive and requires a number of days to be carried out.

It may even be necessary for the user to replace his own player with a new one in order to see the photographs on his television screen, a cost which is anything but negligible.

To sum up, therefore, the solutions which are currently available do not offer a quick and easy image-storage or soundtrack-storage system on a CD in Video format, for data pre-recorded on digital cameras, digital video cameras, mobile phones or handheld computers.

Also, the systems which have been used up until now do not allow a simple reworking process of the images, nor do they allow them to be viewed by means of common equipment such as a television or CD or DVD player without the use of special systems.

In view of theses considerations, it is quite clear that it is important to find alternative solutions to those currently available.

The aim of this invention is also to overcome the aforementioned drawbacks.

BRIEF SUMMARY OF THE INVENTION

This and other aims are achieved by means of the invention described herein according to the characteristics in the attached claims, by solving the problems described with a system, for commercial use, to store and copy images downloaded from a memory unit for digital equipment and its relative equipment, which includes the said digital images, and soundtrack, being previously recorded with a digital camera, digital video-camera, mobile phone or handheld computer; followed by:

a) the transfer of the contents from the memory of the digital camera, digital video-camera, mobile phone or handheld computer to a data storage, processing and copying unit for the images and soundtrack, and which is located inside a service center;
b) the transfer is carried out by extracting the memory support unit in order to insert it in the image and soundtrack storage, processing and copying unit, which downloads the contents into the memory of the said unit, so that the memory support may be returned to the customer, that is, the content of the memory is transferred via air-waves to the main memory of the data-storage unit; and
c) the images and/or soundtrack are processed and copied on to a support means in Video CD or Super Video CID format and/or on to a DVD in DVD format, and the said images are sent to a receiver station.

In this way, by means of the significant creative content, which leads to an immediate technical progress, various objectives are reached.

A first aim is that it is that is easy to automatically and quickly store images and/or soundtracks recorded on digital cameras, digital video cameras, mobile phones or handheld computers on a CD. From a practical point of view, there is the advantage that the memory support units of the digital equipment may be quickly emptied, which means that they may be quickly reused at a very low cost.

A second aim is that the data may be viewed both on a normal television and on a computer monitor by means of a DVD player or CD player, thus avoiding the purchase of special, dedicated players. Amongst these advantages, it is also possible to transfer the data to one or more chosen users on a network.

Furthermore, the equipment used for the aforementioned operations is quite small and may be easily fitted into any surroundings. Finally, from a structural viewpoint, the equipment is not particularly complicated, is relatively cheap to buy, small and easy to repair and means that the services proposed may be used at very favorable prices.

These and other advantages will be shown in the following detailed description and attached schematic drawings of at least one preferential application of the solution, the details of which are intended to be an example and not a limitation.

DETAILED DESCRIPTION OF THE INVENTION

Figure 1:
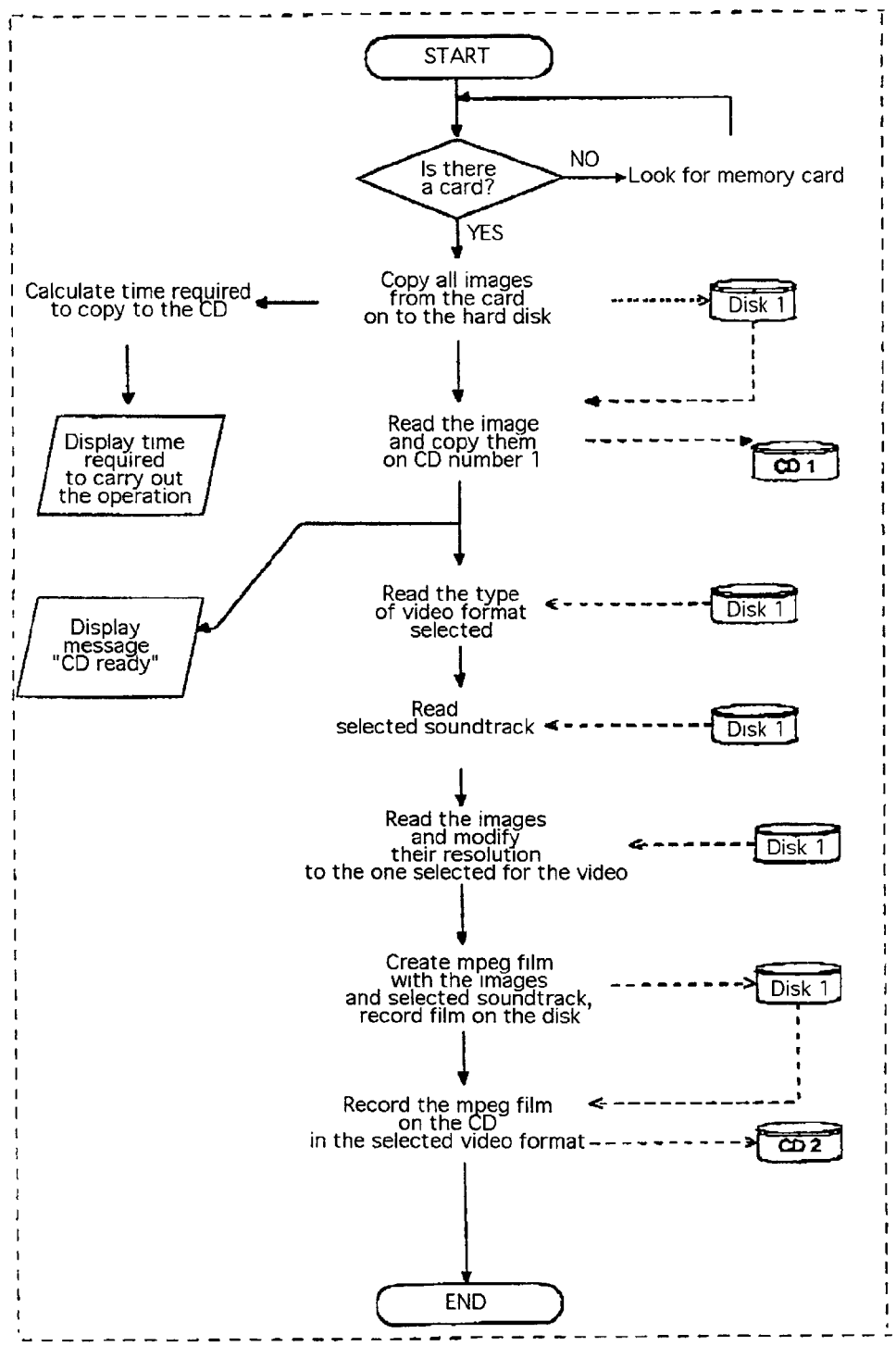
FIG. 1 shows a flow diagram of the software for the automatic control of the service, which is contained in the equipment located in a service center.

With reference to the aforementioned Figures, the customer, once he has recorded the images through a digital equipment, possibly also along with the soundtrack, goes to a service center or any other kind of sales point, especially a photography shop or department store. In the service center, there is a unit in operation for the storage, processing and copying of the images and soundtrack (A). The said unit (A) is composed of the relative hardware with a traditional feeding system (7), and includes at least the following:

a monitor (1) which may also be of the touch-screen type;
a keyboard (2) and relative accessories;
a central processor (3);
software (4, 5);
a recording device (6) to record on a CD (C1,C2) in video CD format and to record on DVD;
a hard disk (7); and
a network card (8) in order to also transmit via internet.

The unit (A) may also be connected to other peripherals such as a scanner (9) or a printer (10), and may also interface, with or without a cable connection, with cameras and/or mobile phones which have this kind of system.

The customer extracts the memory support unit (B1,B2, B3,B4,B5) from his equipment, which may be in the form of a smart card, compact flash, PCMCIA, floppy disk or a memory stick, and inserts it into the unit (A) so that it may be read by the reading unit. All of the manual operations may be either carried out by the customer himself or by a technician who is present inside the service center.

As an alternative, the memory (136) of a corresponding digital apparatus, for example with the blue tooth system, may be downloaded into unit (A) wireless, which means that the memory support unit does not have to be removed from the equipment.

In this case, the operator carries out the various steps, and completes the operation by inserting a blank CD (C1,C2) into the unit (A).

The software, which is controlled by the central processor (3), may be either automatic (4) or semi-automatic (5).

Method used with the automatic software (4). Example shown in FIG. 1.

The reading unit reads the number and type of images contained in the memory unit (B1,B2, B3,B4,B5 and B6) and estimates how much time is needed to make the two CDs (C1,C2). The time is shown on the screen (1). The images are read and saved in a temporary position on the hard disk (7). At this point, the memory support unit (B1,B2,B3,B4,B5) may be taken out and reused. A message shows up which notifies the user that this operation may be carried out. The images are copied from the memory unit to the CD in the same format as the original format created by the camera. The first CD (C1) is now available and may be extracted. A message shows up which notifies the user that this operation may be carried out. The second CD (C2) is inserted in the recording unit by the operator. The images recorded in the memory unit are automatically modified to get the best resolution possible for the chosen video format (e.g. 352×288 pixels for the PAL video format on a Video CD, 704×576 pixels for the PAL "still picture" format on a Super Video CD, etc.). A film is then created, made up by repeating each single image for a pre-set time.

A preset fade-away effect is inserted in the transition between each of the images. A soundtrack is chosen from those which are pre-recorded and memorized on the hard disk (7), and added to the film. The film is then encoded into the required format (e.g. MPEG-1 for a Video CD) and recorded on the CD (C2) in the video format chosen, such as the Video CD format. The second CD (C2) is now ready and may be extracted. A message shows up which notifies the user that this operation may be carried out. The images recorded on the hard disk (7) are canceled.

At this point, the operation is complete and the customer has two CDs in his possession. The first one (C1) contains the high resolution images, which may be stored and viewed on a personal computer. The second one (C2) (or DVD) contains the images predisposed to be viewed with a DVD player and a normal television. At this point, the unit for making the CDs (C1,C2) is ready for another user.

From an operational point of view, the automatic software (4) is designed to carry out the following steps:
i) start-up;
ii) checks to see if there is a memory unit (B1,B2,B3,B4, B5 and B6) from the digital equipment present. If it is present, it goes on to step (iii), if it is not present, it goes back to step (i);
iii) copies all the images from the memory (B1,B2,B3, B4,B5 and B6) on the hard disk (7);
iv) calculates the time required to copy the images on to the CD (C1) and displays this information on the monitor (1);
v) reads the images and copies them on to the CD (C1);
vi) displays a message on the monitor (1) that the CD (C1) is ready;
vii) reads the type of video format chosen;
viii) proposes a soundtrack and asks for confirmation, or asks to choose another piece of music;
ix) reads the images and accepts the modifications, for example the type of resolution, and takes it to the one chosen for the video;
x) creates the mpeg movie with the images and soundtrack and saves it on the hard disk (7);
xi) the movie, which has now been saved, is recorded on the CD (C2) with the recording unit (6) in the video format required; and
xii) end of cycle.

Figure 2:
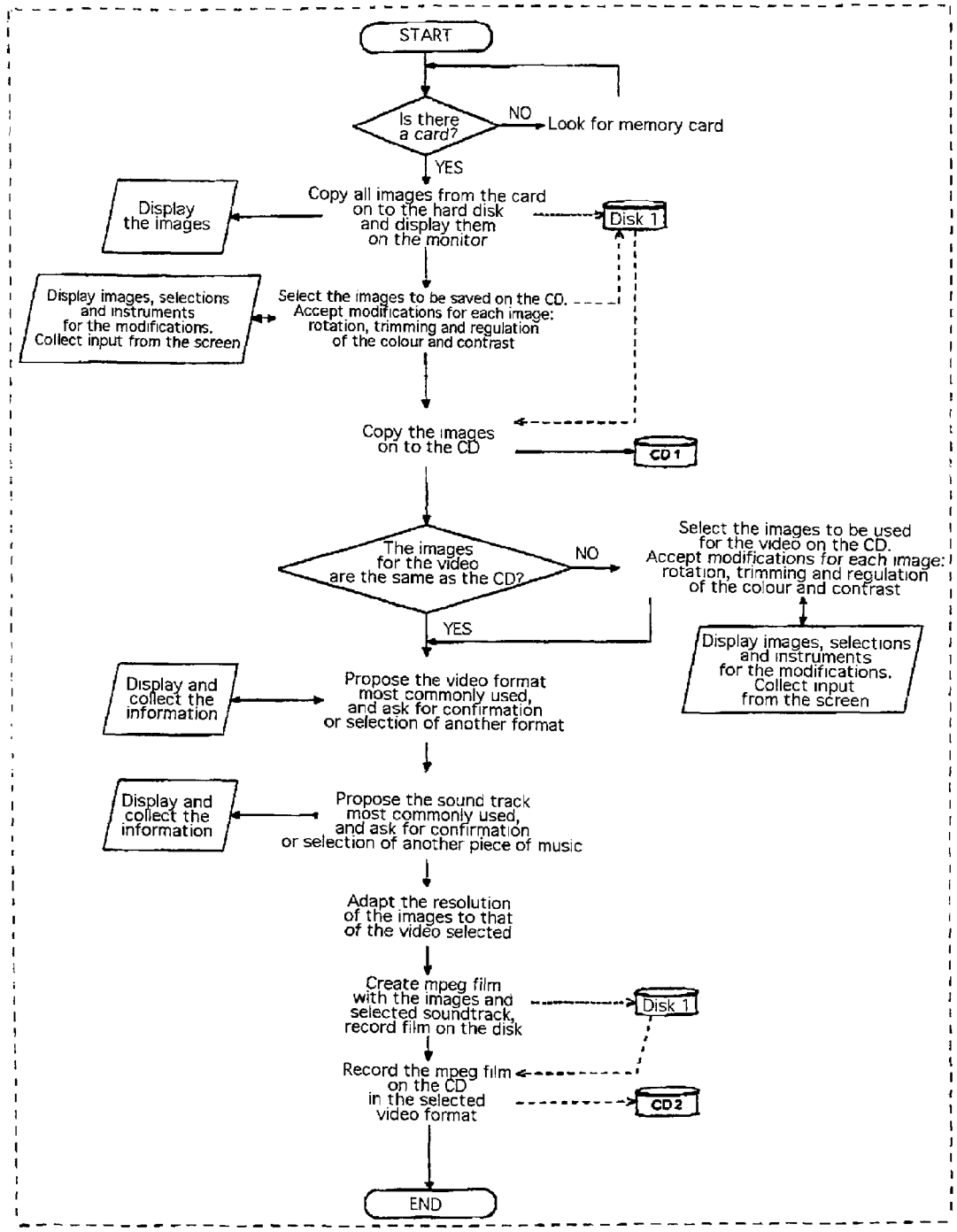
FIG. 2 shows another flow diagram of the software for the control of the service, which is contained in the equipment located in a service center, but in a semi-automatic mode.
Figure 3:
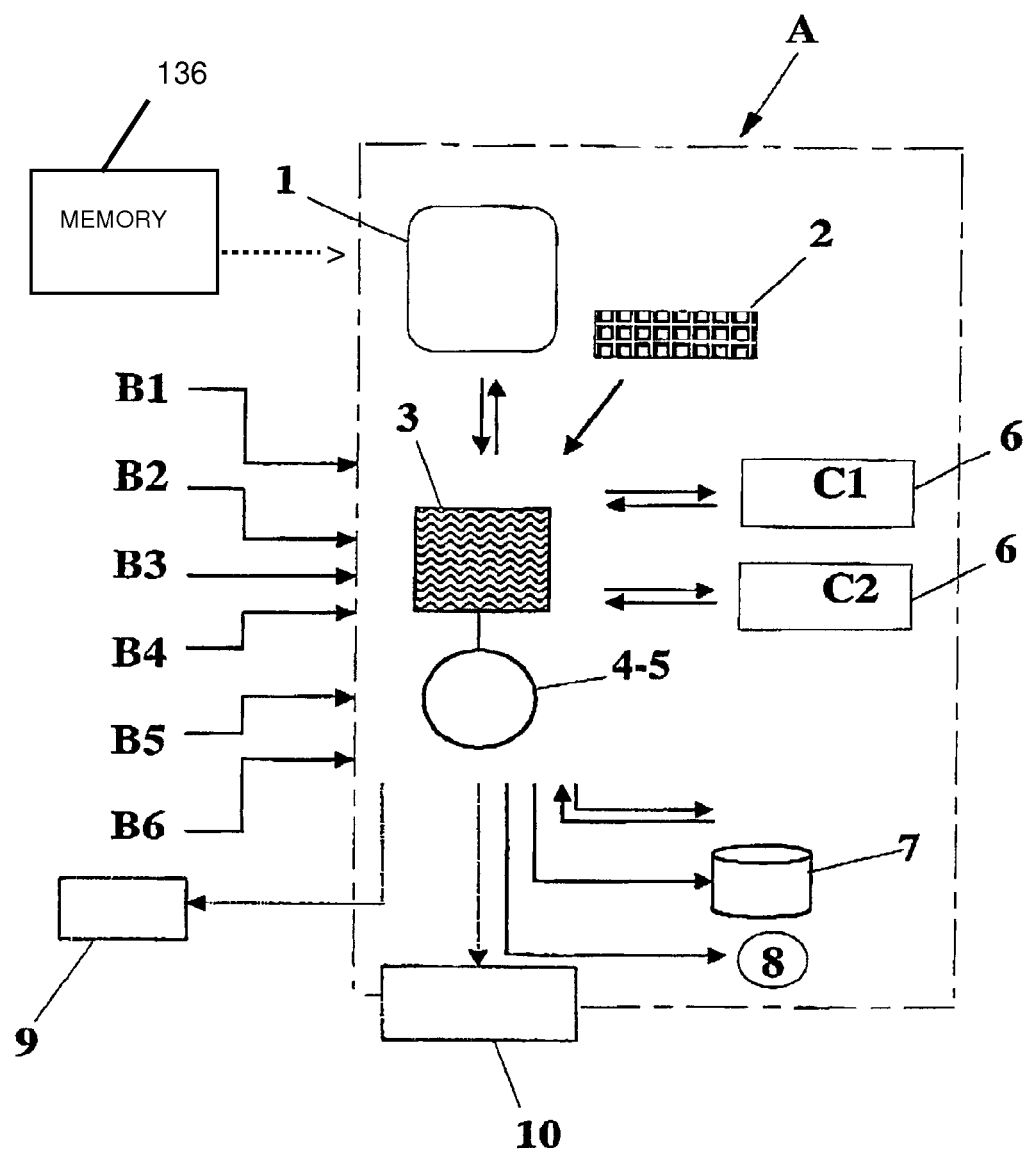
FIG. 3 shows a block diagram of the hardware employed to run the service of storage and reproduction of the images.

Method used with the semi-automatic software (5). Example shown in FIG. 2.

This mode is different from the automatic mode, in that it is possible to follow the various phases step-by-step and carry out the choices regarding the making of the CDs (C1,C2) during the process, and to analyze the images and film on the monitor before they are recorded on the CDs (C1, C2).

All the operations are carried out with the monitor (1) and the data-input device (2) (keyboard, mouse or touch-screen).

The images may be modified by means of simple operations, such as rotation and zooming, before they are recorded on the CD (C1,C2) together with the original copies before being inserted in the movie.

At any time, it is possible to complete the semi-automatic operation by continuing with the fully automatic mode.

Going further into detail, the semi-automatic software (5) works in the following way:
i) start-up;
ii) check to see if there is a memory unit (B1,B2,B3,B4, B5 and B6) from the digital equipment present. If it is present, it goes on to step (iii), if it is not present, it goes back to step (i);
iii) copies all the images from the memory (B1,B2,B3, B4,B5 and B6) on the hard disk (7) and displays them on the monitor (1);
iv) chooses the images to be saved on the CD (C1). Each image may be modified, such as rotation, cut-outs and alteration of the colors and the contrast. The images are shown on the monitor (1) so that the instruments required to carry out the modifications may be selected;
v) the images which have been saved are copied on to the CD (C1);

vi) there is a request to verify if the images are the same as the CD (C1). If the answer is no, it goes back to step (iv), if the answer is yes, it goes on to step (vii);
vii) proposes the most commonly used video format, asks for confirmation, or chooses another format. The information is displayed on the monitor (1) and is stored;
viii) proposes a soundtrack and asks for confirmation, or asks to choose another piece of music;
ix) adapts the resolution of the images to that of the video chosen;
x) creates the mpeg film with the images and soundtrack and saves it on the hard disk (7);
xi) the movie, which has now been saved, is recorded on the CD (C2) with the recording unit (6) in the video format required; and
xii) end of cycle.

The following options are also available:

If the processor is powerful enough, the operations for the preparation of the movie may be carried out while the first CD (C1) is being copied, thus reducing the total time required to make the two CDs (C1,C2);

By adding a second recording unit (6), both CDs (C1,C2) may be loaded at the beginning in order to avoid interruptions or delays during the process, due to the second CD (C2) not being inserted when the first one (C1) is ready;

A recording device (6) may also include a system for recording on DVD. The DVD unit means that a large number of images and movies may be recorded with a higher quality than with a Video CD; and Apart from the recording unit (6) for CDs or DVD, a recording unit for normal VHS video cassettes may also be included. The movie, created by the unit by joining images from the digital camera, may then be recorded on a video cassette in order to be seen on a television screen with a normal video recorder.

I claim:

1. A process for storing and copying digital images or soundtracks downloaded from a memory unit of digital equipment comprising:
   acquiring the digital images or soundtracks from at least one of a digital camera, a digital video-camera, a mobile phone and a handheld computer into the memory unit;
   transferring contents of the memory unit of the digital equipment into a memory of a unit for storage and reproduction of the digital images or soundtracks;
   processing of the digital images or soundtracks; and
   reproducing the process digital images or soundtracks onto a support, said step of processing comprising:
      starting up a processor;
      checking to see if the memory unit is present;
      copying all of the digital images or soundtracks from the memory unit onto a hard disk;
      calculating a time required for the copying onto a CD;
      displaying the calculated time on a monitor;
      reading the digital images or soundtracks;
      copying the read digital images or soundtracks onto the CD;
      displaying a message on the monitor that the CD is ready;
      reading a type of video format that is chosen;
      proposing a soundtrack to the user;
      asking for a confirmation of the proposed soundtrack;
      reading the digital images and transporting the digital images chosen for a video;
      creating an mpeg movie with the chosen digital images and the soundtrack;
      saving the mpeg movie on the hard disk; and
      recording the saved mpeg movie onto the CD with a recording unit in a required video format, said unit for storage and reproduction having a monitor with a keyboard cooperative by a central processing unit therewith, said central processing unit having software controllably interactive therewith, said unit for storage and reproducing having a recording device suitable for recording on said support in a video CD format or a DVD format, said central processing unit cooperative with the hard disk or a network card.

2. The process of claim 1, said support being a CD of a video CD format.

3. The process of claim 1, said support being of a CD of a super video CD format.

4. The process of claim 1, said support being a DVD.

5. The process of claim 1, said step of transferring comprising:
   downloading contents of the memory unit into the unit for storage and reproducing without removing the memory unit from the digital equipment.

6. The process of claim 1, further comprising:
   reproducing contents of the digital images or soundtrack in the unit for storage and reproduction in a video CD or super video CD or DVD format; and
   transmitting the reproduced contents to a remote receiver station.

7. A process for storing and copying digital images or soundtracks downloaded from a memory unit of digital equipment comprising:
   acquiring the digital images or soundtracks from at least one of a digital camera, a digital video-camera, a mobile phone and a handheld computer into the memory unit;
   transferring contents of the memory unit of the digital equipment into a memory of a unit for storage and reproduction of the digital images or soundtracks;
   processing of the digital images or soundtracks; and
   reproducing the processed digital images or soundtracks onto a support, said step of processing comprising:
      starting up a processor;
      checking to see if the memory unit is present;
      copying all of the digital images or soundtracks from the memory unit onto a hard disk;
      displaying the copied digital images or soundtracks on a monitor;
      choosing the displayed copied digital images;
      saving the chosen displayed copied digital images on a CD;
      selectively modifying the saved images by selecting instruments for carrying out the modifications;
      copying the saved images onto the CD;
      requesting a verification of the saved images on the CD;
      choosing a desired video format and asking for confirmation;
      displaying the chosen desired video format on the monitor;
      proposing a soundtrack to the user;
      asking for a confirmation of the proposed soundtrack;
      adapting a resolution of the saved images to that of the chosen desired video format;
      creating an mpeg movie with the chosen digital images and the soundtrack;
      saving the mpeg movie on the hard disk; and
      recording the saved mpeg movie onto the CD with a recording unit in a required video format, said unit for storage and reproduction having a monitor with a keyboard cooperative by a central processing unit therewith, said central processing unit having software controllably interactive therewith, said unit for storage and reproducing having a recording device suitable for recording on said support in a video CD format or a DVD format, said central processing unit cooperative with the hard disk or a network card.

* * * * *